US010591986B2

(12) United States Patent
Sugaya

(10) Patent No.: US 10,591,986 B2
(45) Date of Patent: Mar. 17, 2020

(54) REMOTE WORK SUPPORTING SYSTEM, REMOTE WORK SUPPORTING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/565,747

(22) PCT Filed: Apr. 17, 2017

(86) PCT No.: PCT/JP2017/015498
§ 371 (c)(1),
(2) Date: Oct. 11, 2017

(87) PCT Pub. No.: WO2018/193509
PCT Pub. Date: Oct. 25, 2018

(65) Prior Publication Data
US 2020/0033936 A1 Jan. 30, 2020

(51) Int. Cl.
*G06F 3/01* (2006.01)
*G06F 3/16* (2006.01)
(Continued)

(52) U.S. Cl.
CPC .......... *G06F 3/011* (2013.01); *G02B 27/0172* (2013.01); *G06F 3/167* (2013.01);
(Continued)

(58) Field of Classification Search
CPC ..... G06F 3/011; G06F 3/167; G02B 27/0172; G02B 2027/0132; G02B 2027/0138; G02B 2027/014; G02B 2027/0141; G06T 19/006
See application file for complete search history.

(56) References Cited

U.S. PATENT DOCUMENTS 5,801,704 A 9/1998 Oohara et al.
2011/0234386 A1 9/2011 Matsuda
(Continued)

FOREIGN PATENT DOCUMENTS

JP 8-63326 3/1996
JP 2003-6062 1/2003
(Continued)

*Primary Examiner* — Lisa S Landis
(74) *Attorney, Agent, or Firm* — Lex IP Meister, PLLC

(57) ABSTRACT

A remote work supporting system shares an image 200 photographed by a wearable terminal between the wearable terminal and a remote terminal in order to support remote work. An image acquiring unit acquires the image 200 photographed by the wearable terminal. A screen sharing unit screen-shares the image 200 between the wearable terminal and the remote terminal. An accepting unit accepts an input of instruction information for the image 200 from the remote terminal. A first display unit superimposes and displays the image 200 and a virtual object 201 corresponding to the instruction information on the wearable terminal. A second display unit superimposes and displays the image 200 and the virtual object 201 on the remote terminal. An image recognizing unit analyzes the image 200 to recognize a state of a body part. A changing unit changes a display of the virtual object 210 by the first display unit and the second display unit based on the recognized state.

13 Claims, 18 Drawing Sheets

(51) Int. Cl.
*G06T 19/00* (2011.01)
*G02B 27/01* (2006.01)
*H04W 88/02* (2009.01)

(52) U.S. Cl.
CPC ...... *G06T 19/006* (2013.01); *G02B 2027/014* (2013.01); *G02B 2027/0132* (2013.01); *G02B 2027/0138* (2013.01); *G02B 2027/0141* (2013.01); *H04W 88/02* (2013.01)

(56) References Cited

U.S. PATENT DOCUMENTS

2013/0335321 A1* 12/2013 Sugita ................... G06F 3/0488
345/157
2016/0225156 A1* 8/2016 Ikenoue ............. G06K 9/00342

FOREIGN PATENT DOCUMENTS

| JP | 2004-94622 | 3/2004 |
| JP | 2007-34238 | 2/2007 |
| JP | 2009-258954 | 11/2009 |
| JP | 2011-209965 | 10/2011 |
| JP | 2012-164115 | 8/2012 |

\* cited by examiner

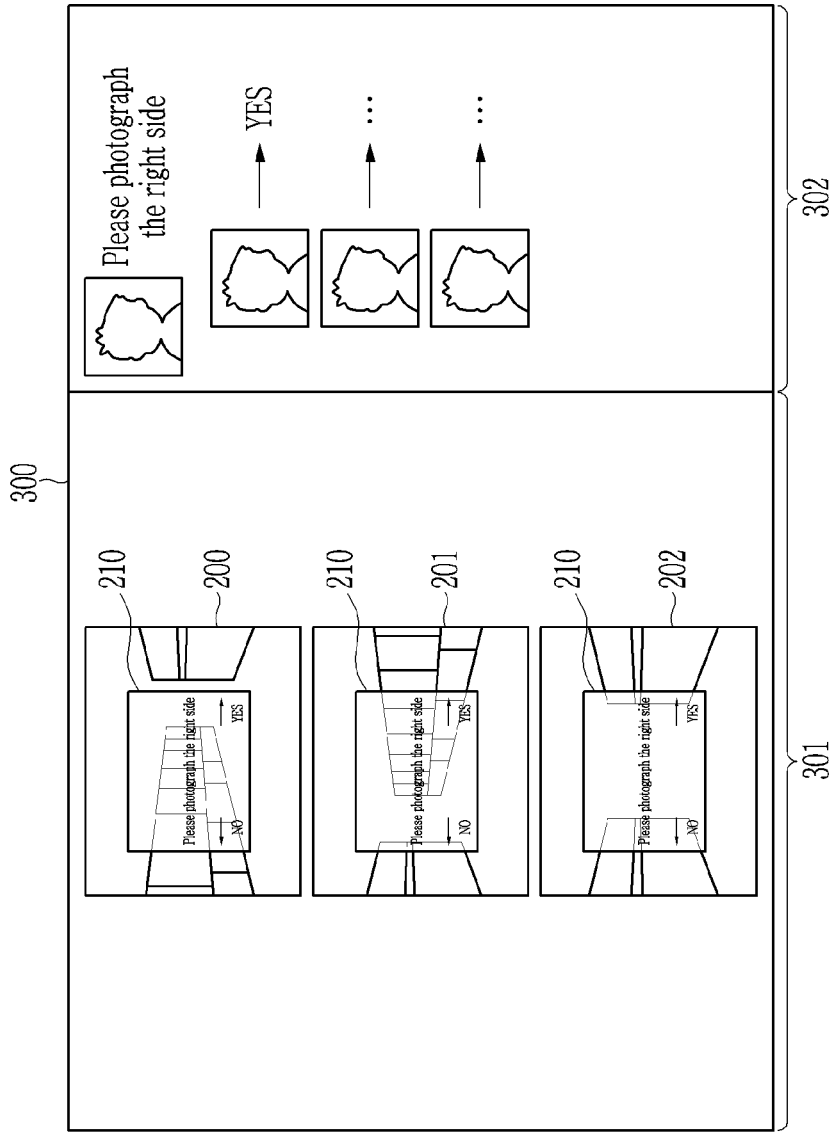

REMOTE WORK SUPPORTING SYSTEM, REMOTE WORK SUPPORTING METHOD, AND PROGRAM

TECHNICAL FIELD

The present invention relates to a technique for supporting remote work.

BACKGROUND ART

There is known a technique for sharing a screen among a plurality of devices. For example, Patent Document 1 discloses a technique in which a server acquires screen information of a plurality of clients and displays the screen information in a list form.

PRIOR ART DOCUMENT

Patent Document

Patent Document 1: Japanese Patent Application Publication No. 2003-6062

SUMMARY OF THE INVENTION

Technical Problem

Meanwhile, at a work site of a factory or the like, there is a case where an instructor remotely gives a work instruction to a worker for a remote work support. It is preferable that the worker responds to the instruction of the instructor in a way that both hands are free like a voice, in order to perform the work. However, when a noise level of the work site is high, it is difficult to support the remote work by the voice.

It is an object of the present invention to realize smooth remote work support even when a user of a wearable terminal is in an environment where it is difficult to receive a remote work support by the voice.

Technical Solution

The present invention provides a remote work supporting system for sharing an image photographed by a wearable terminal between the wearable terminal and a remote terminal in order to support remote work, the remote work supporting system including an image acquiring unit that acquires the image photographed by the wearable terminal, a screen sharing unit that screen-shares the image between the wearable terminal and the remote terminal, an accepting unit that accepts an input of instruction information for the image from the remote terminal, a first display unit that superimposes and displays the image and a virtual object corresponding to the instruction information on the wearable terminal, a second display unit that superimposes and displays the image and the virtual object on the remote terminal, an image recognizing unit that analyzes the image to recognize a state of a body part, and a changing unit that changes a display of the virtual object by the first display unit and the second display unit based on the recognized state.

Effects of the Invention

According to the present invention, even when the user of the wearable terminal is in an environment where it is difficult to receive remote work support by the voice, smooth remote work support can be realized.

BRIEF DESCRIPTION OF THE DRAWINGS

FIG. 18 is a diagram showing an example of a screen 300 displayed on a display device 26 in a modified example.

DESCRIPTION OF REFERENCE NUMBERS

1: remote work supporting system, 10: wearable terminal, 20: remote terminal, 30: server device, 101: image acquiring unit, 102: accepting unit, 103: voice recognizing unit, 104: object generating unit, 105: screen sharing unit, 106: first display unit, 107: second display unit, 108: image recognizing unit, 109: changing unit, 110: response generating unit, 161: display panel

DETAILED DESCRIPTION OF THE EMBODIMENTS

Configuration

Figure 1:
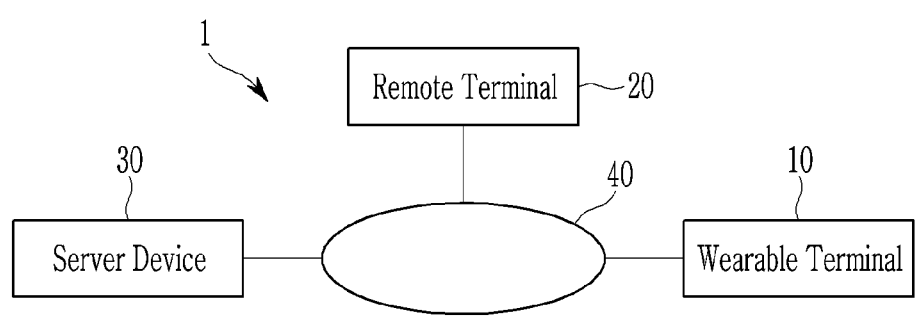
FIG. 1 is a diagram showing an example of a configuration of a remote work supporting system 1.

FIG. 1 is a diagram showing an example of a configuration of a remote work supporting system 1. The remote work supporting system 1 is a system for supporting remote work. It is noted that the remote work supporting system 1 is designed for supporting the remote work and is different from, for example, a video conference system for holding a conference while watching a face with a remote person. In the remote work support system 1, a wearable terminal 10 has a function of photographing an image, and the image photographed by the wearable terminal 10 is shared between the wearable terminal 10 and a remote terminal 20. In this case, a user of the remote terminal 20 can understand a situation of a user of the wearable terminal 10 by viewing the image photographed by the wearable terminal 10. For example, an instructor having a predetermined qualification may use the remote terminal 20 and an on-site worker may use the wearable terminal 10. In this case, the instructor can give a work instruction to the on-site worker from a remote location. In the following description, the user of the wearable terminal 10 is referred to as a "first user" and the user of the remote terminal 20 is referred to as a "second user".

The remote work supporting system 1 includes the wearable terminal 10, the remote terminal 20, and a server device 30. The wearable terminal 10, the remote terminal 20, and the server device 30 are connected via a communication line 40. The wearable terminal 10 is wirelessly connected to the communication line 40. The communication line 40 may include, for example, the Internet and a wireless communication network.

Figure 2:
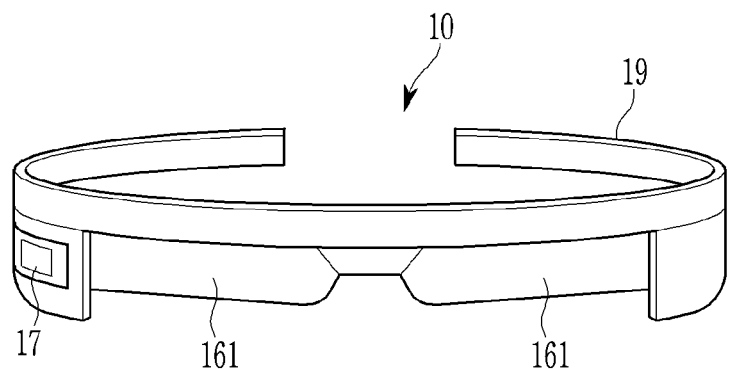
FIG. 2 is a diagram showing an example of an appearance of a wearable terminal 10.

FIG. 2 is a diagram showing an example of an appearance of a wearable terminal 10. In this example, the wearable terminal 10 is a binocular glasses-type terminal to be worn on a head of a first user. The wearable terminal 10 includes a frame 19 and two display panels 161. The frame 19 is a member holding the two display panels 161. The display panel 161 is a plate-shaped member having light transparency and is provided in front of the first user's eyes, i.e., within a field of view of the first user. The first user can see a front space through the display panel 161. Here, "having light transparency" means that a back side can be seen through the display panel 161. The display panel 161 may be transparent or translucent.

Figure 3:
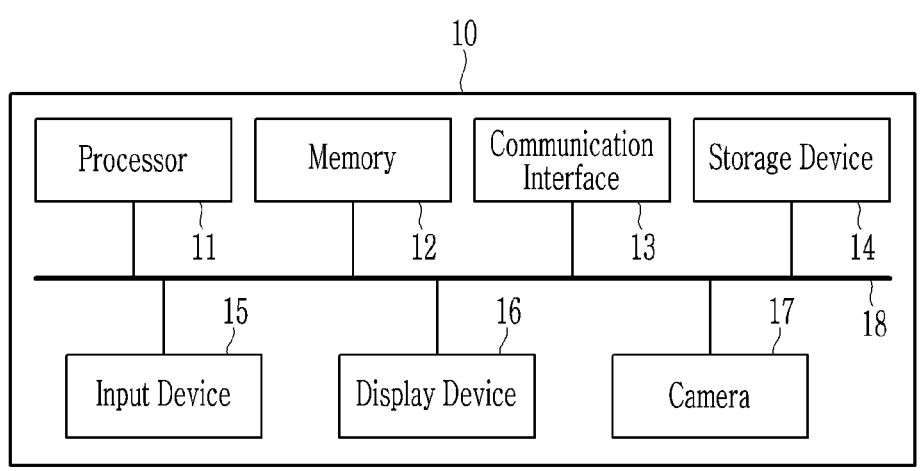
FIG. 3 is a diagram showing an example of a hardware configuration of a wearable terminal 10.

FIG. 3 is a diagram showing an example of a hardware configuration of a wearable terminal 10. The wearable terminal 10 includes a processor 11, a memory 12, a communication interface 13, a storage device 14, an input device 15, a display device 16, and a camera 17. These devices are connected via a bus 18.

The processor 11 loads a program in the memory 12 and executes the program, thereby performing various controls or processing. As the processor 11, for example, a CPU (central processing unit) may be used. The memory 12 stores the program to be executed by the processor 11. As the memory 12, for example, a ROM (read only memory), a RAM (random access memory), or a combination of the ROM and RAM may be used. The communication interface 13 is connected to a communication line 40 and performs a data communication according to a predetermined wireless communication standard. The storage device 14 stores various data and programs. As the storage device 14, for example, a flash memory may be used.

The input device 15 is used for an operation of the wearable terminal 10. As the input device 15, for example, a key may be used. The display device 16 displays various kinds of information on the above-described display panels 161. The display device 16 may include, for example, the display panels 161 and a projector that projects an image on the display panels 161. When the image is displayed on the display panels 161, the user can view the image displayed on the display panels 161 together with the front space.

The camera 17 includes an image pickup device and an optical system, and photographs an image of a subject by forming the image of the subject on the image pickup device by the optical system. As the camera 17, for example, a digital camera is used. The camera 17 is installed at a position and direction capable of photographing the image along a field of view of the user.

Figure 4:
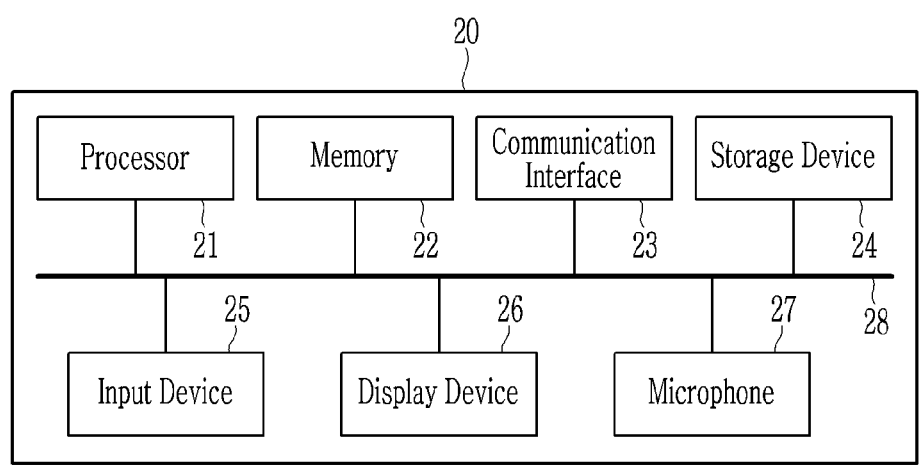
FIG. 4 is a diagram showing an example of a hardware configuration of a remote terminal 20.

FIG. 4 is a diagram showing an example of a hardware configuration of a remote terminal 20. The remote terminal 20 may be, for example, a personal computer. The remote terminal 20 includes a processor 21, a memory 22, a communication interface 23, a storage device 24, an input device 25, a display device 26, and a microphone 27. These devices are connected via a bus 28.

The processor 21 loads a program in the memory 22 and executes the program, thereby performing various controls or processing. As the processor 21, for example, a CPU may be used. The memory 22 stores the program to be executed by the processor 21. As the memory 22, for example, a ROM, a RAM, or a combination of the ROM and RAM may be used. The communication interface 23 is connected to a communication line 40 and performs a data communication according to a predetermined communication standard. The storage device 24 stores various data and programs. As the storage device 24, for example, a hard disk, a flash memory, or a combination of the hard disk and the flash memory may be used.

The input device 25 is used for an operation of the remote terminal 20. As the input device 25, for example, a keyboard and a mouse, a touch sensor forming a touch panel, or a combination of the keyboard, the mouse, and the touch sensor may be used. The display device 26 displays various kinds of information. As the display device 26, for example, a liquid crystal display may be used. The microphone 27 collects a voice and converts it into a voice data.

Figure 5:
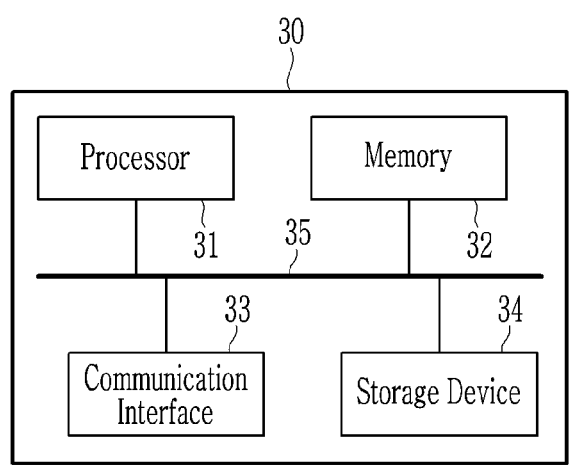
FIG. 5 is a diagram showing an example of a hardware configuration of a server device 30.

FIG. 5 is a diagram showing an example of a hardware configuration of a server device 30. The server device 30 includes a processor 31, a memory 32, a communication interface 33, and a storage device 34. These devices are connected via a bus 35.

The processor 31 loads a program in the memory 32 and executes the program, thereby performing various controls or processing. As the processor 31, for example, a CPU may be used. The memory 32 stores the program to be executed by the processor 31. As the memory 32, for example, a ROM, a RAM, or a combination of the ROM and RAM may be used. The communication interface 33 is connected to a communication line 40 and performs a data communication according to a predetermined communication standard. The storage device 34 stores various data and programs. As the storage device 34, for example, a hard disk, a flash memory, or a combination of the hard disk and the flash memory may be used.

Figure 6:
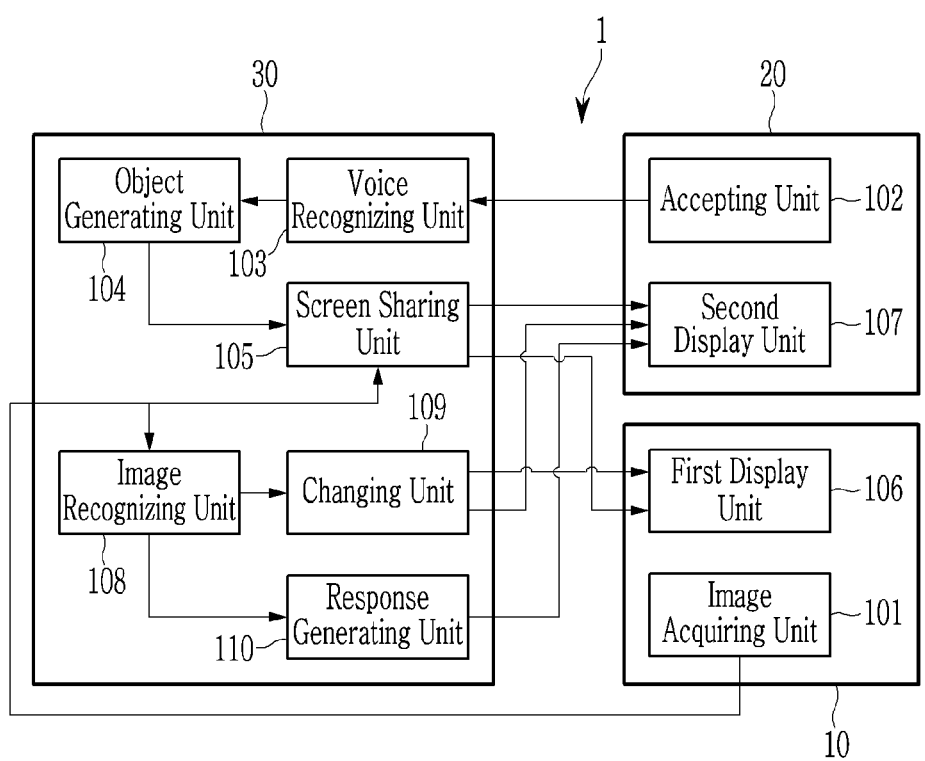
FIG. 6 is a diagram showing an example of a functional configuration of a remote work supporting system 1.

FIG. 6 is a diagram showing an example of a functional configuration of a remote work supporting system 1. The remote work supporting system 1 includes an image acquiring unit 101, an accepting unit 102, a voice recognizing unit 103, an object generating unit 104, a screen sharing unit 105, a first display unit 106, a second display unit 107, an image recognizing unit 108, a changing unit 109, and a response generating unit 110.

In this example, the image acquiring unit 101 and the first display unit 106 are provided on the wearable terminal 10. These functions are realized by a cooperation of a program stored in the memory 12 and the processor 11 executing the program. The accepting unit 102 and the second display unit 107 are provided on the remote terminal 20. These functions are realized by a cooperation of a program stored in the memory 22 and the processor 21 executing the program. The voice recognizing unit 103, the object generating unit 104, the screen sharing unit 105, the image recognizing unit 108, the changing unit 109, and the response generating unit 110 are provided on the server device 30. These functions are realized by a cooperation of a program stored in the memory 32 and the processor 31 which executes the program.

The image acquiring unit 101 acquires an image photographed by the camera 17. The screen sharing unit 105 screen-shares the image acquired by the image acquiring unit 101 between the wearable terminal 10 and the remote terminal 20. When the second user instructs this image by a voice, the accepting unit 102 accepts an input of a voice data indicating the voice collected by the microphone 27. The voice recognizing unit 103 recognizes the content of the voice of the second user by analyzing the voice data accepted by the accepting unit 102. A well-known voice recognition technique may be used to recognize the content of the voice. The object generating unit 104 generates a virtual object based on the content of the voice recognized by the voice recognizing unit 103. This virtual object may be, for example, one in which the content of the voice is described.

The first display unit 106 displays the image acquired by the image acquiring unit 111 and the virtual object generated by the object generating unit 104 on the wearable terminal 10 by superimposing them. This display may be performed using an AR (augmented reality) technology. The second display unit 107 displays the image acquired by the image acquiring unit 111 and the virtual object generated by the object generating unit 104 on the remote terminal 20 by superimposing them.

The image recognizing unit 108 analyzes the image acquired by the image acquiring unit 111 and recognizes a state of a finger of the first user. This state includes a movement, a shape, or a position of the finger. For example, the first user may operate the virtual object using the finger seen through the display panel 161. This operation may be, for example, a gesture operation of moving or rotating the virtual object or touching the virtual object.

The operation on the virtual object is recognized based on the image photographed by the image acquiring unit 101 and the virtual object displayed by the first display unit 106. For example, coordinates of the image photographed by the image acquiring unit 101 are converted so that the image becomes an image viewed from a viewpoint position of the first user. Then, a composite image into which the virtual object and the converted image are combined is generated so that a field of view of the first user is reproduced. The operation on the virtual object is recognized based on a positional relationship between the finger of the first user and the virtual object in the composite image and the state of the finger of the first user.

The changing unit 109 changes the display of the virtual object displayed by the first display unit 106 and the second display unit 107 based on the state recognized by the image recognizing unit 108. For example, the changing unit 109 may change the display of the virtual object by transmitting control information for changing the display of the virtual object. In another example, the changing unit 109 may transmit an image data representing changed virtual object. The response generating unit 110 generates response information based on the display of the virtual object and the state of the finger recognized by the image recognizing unit 108. A relationship among the display of the virtual object, the state of the finger, and the content of the response information may be predetermined. When the response information is generated by the response generating unit 110, the second display unit 107 further displays the response information.

In the following description, in a case where the wearable terminal 10 is described as a subject of processing, it means that this processing is executed in cooperation with the program stored in the memory 12 and the processor 11 executing the program. The same applies to the remote terminal 20 and the server device 30.

Operation

Figure 7:
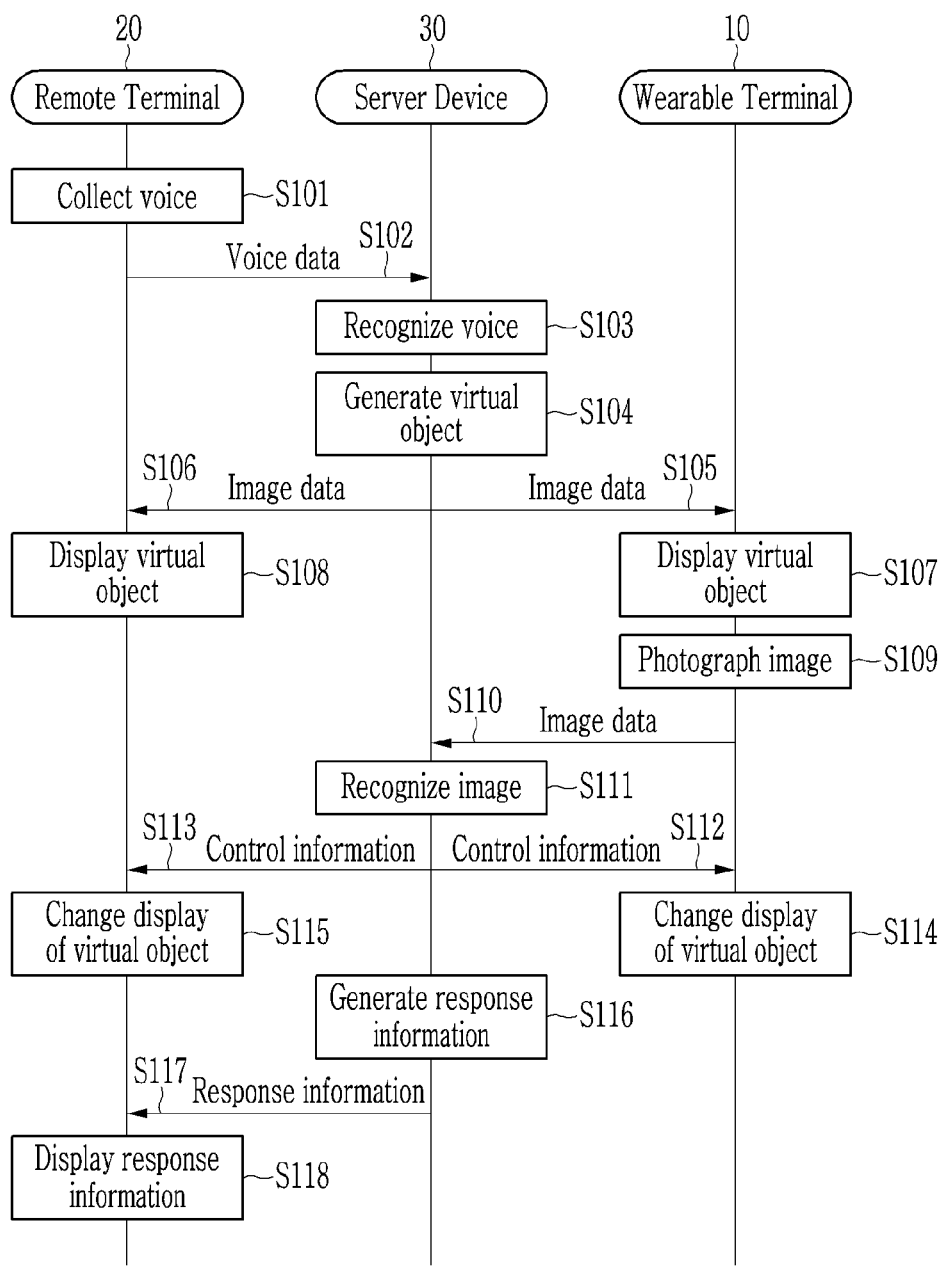
FIG. 7 is a sequence chart showing an operation of a remote work supporting system 1.

FIG. 7 is a sequence chart showing an operation of a remote work supporting system 1. Here, it is assumed that a first user is a worker who works at a work site and a second user is an instructor at a remote location. In this case, the worker wears the wearable terminal 10 and the instructor uses the remote terminal 20 to instruct the worker from the remote location. It is noted that the term "remote location" means that it is a different place and it is not always necessary to be far apart.

In this case, the worker photographs an image of the work site using a camera 17. This image may be a moving image or continuous still images. The image acquiring unit 111 acquires the image 200 (hereinafter referred to as a "photographed image 200") photographed by the camera 17. A wearable terminal 10 transmits an image data representing the photographed image 200 to a server device 30. The server device 30 receives the image data from the wearable terminal 10. A screen sharing unit 105 transmits this image data to the wearable terminal 10 and a remote terminal 20. Each of the wearable terminal 10 and the remote terminal 20 receives the image data from the server device 30. A first display unit 106 displays the photographed image 200 corresponding to the image data on a display device 16. In addition, the second display unit 107 displays the photographed image 200 corresponding to the image data on a display device 26. As a result, screen sharing is performed between the wearable terminal 10 and the remote terminal 20. The instructor understands a work situation of the worker by viewing the photographed image 200 displayed on the display device 26 and provides the worker with a work instruction by a voice. When the instructor provides the work instruction by the voice, processing of step S101 is started.

In step S101, a microphone 27 collects the voice of the instructor and converts the voice into a voice data. Here, it is assumed that the voice "please photograph the right side" is issued by the instructor. In this case, this voice is collected and converted into the voice data. The accepting unit 102 accepts the converted voice data.

In step S102, the remote terminal 20 transmits the voice data to the server device 30. The server device 30 receives the voice data from the remote terminal 20.

In step S103, a voice recognizing unit 103 recognizes the content of the voice by analyzing the voice data and converts the recognized content into a character data. In this example, the content of the voice "please photograph the right side" is converted to the character data. The character data is used as instruction information.

In step S104, an object generating unit 104 generates a virtual object 210 based on the instruction information.

Figure 8:
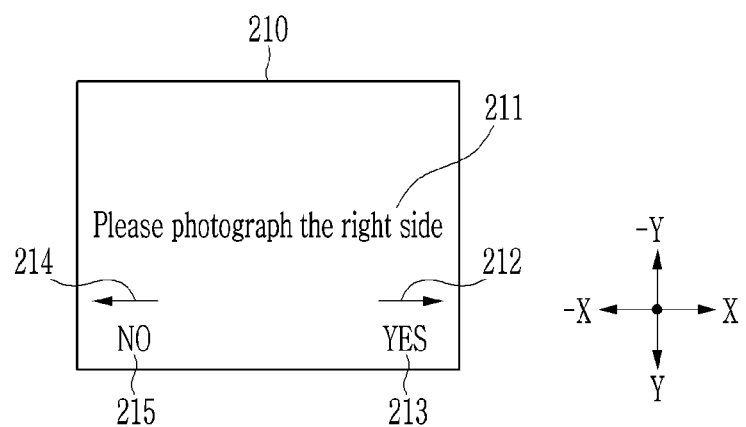
FIG. 8 is a diagram showing an example of a virtual object 210.

FIG. 8 is a diagram showing an example of a virtual object 210. The virtual object 210 includes instruction information 211 of "please photograph the right side". In addition, the virtual object 210 describes an arrow 212 directed in an X direction in the figure and response information 213 of "YES". The response information 213 is arranged at a position corresponding to the arrow 212. This indicates that the response "YES" is performed by moving the virtual object 210 in the X direction in the figure. Furthermore, the virtual object 210 describes an arrow 214 directed in a −X direction in the figure and response information 215 of "NO". This indicates that the response "NO" is performed by moving the virtual object 210 in the −X direction in the figure. While the virtual object 210 is a quadrangle in the example shown in FIG. 8, other shapes may be used.

In steps S105 and S106, a screen sharing unit 105 transmits an image data representing the virtual object 210 generated in step S104 to the wearable terminal 10 and the remote terminal 20. However, the instruction information of "please photograph the right side" obtained in the above-described step S103 is transmitted to the remote terminal 20 together with the image data. Each of the wearable terminal 10 and the remote terminal 20 receives the image data from the server device 30.

In step S107, the first display unit 106 displays the virtual object 210 corresponding to the image data on the display device 16. More specifically, the virtual object 210 is displayed on the display panel 161.

Figure 9:
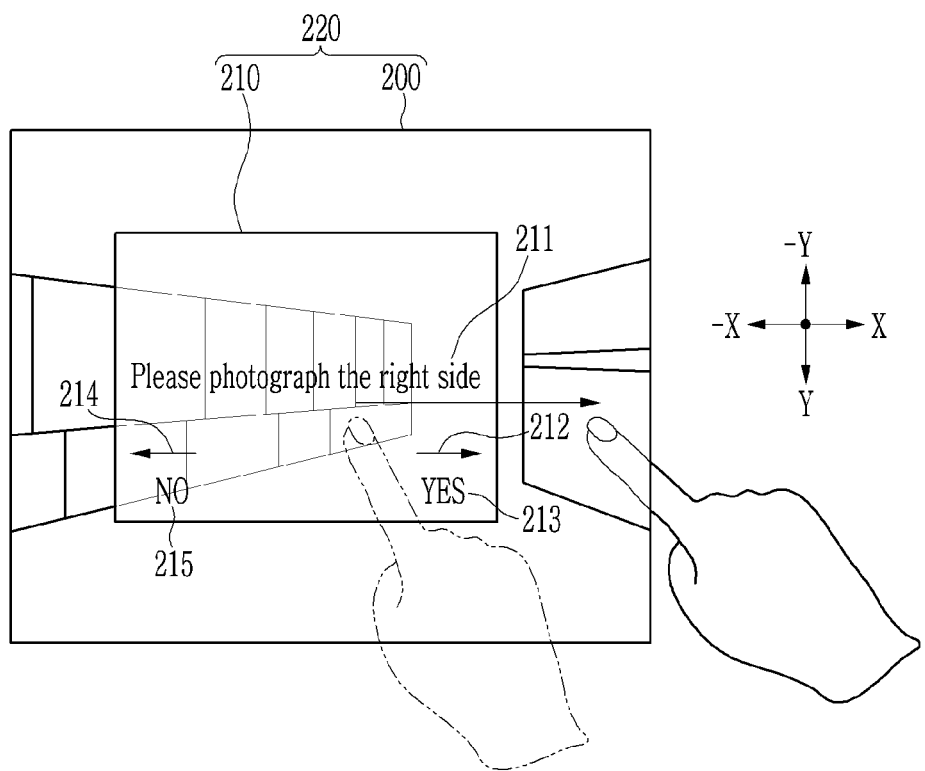
FIG. 9 is a diagram showing an example of a screen 220 displayed on a display device 16.

FIG. 9 is a diagram showing an example of a screen 220 displayed on the display device 16. The screen 220 includes the photographed image 200 and the virtual object 210. The virtual object 210 is superimposed and displayed on the photographed image 200. As a result, the worker seems to have the virtual object 210 appear on the actual work site.

In step S108, the second display unit 107 displays the virtual object 210 corresponding to the image data received from the server device 30 on the display device 26 like the first display unit 106.

Figure 10:
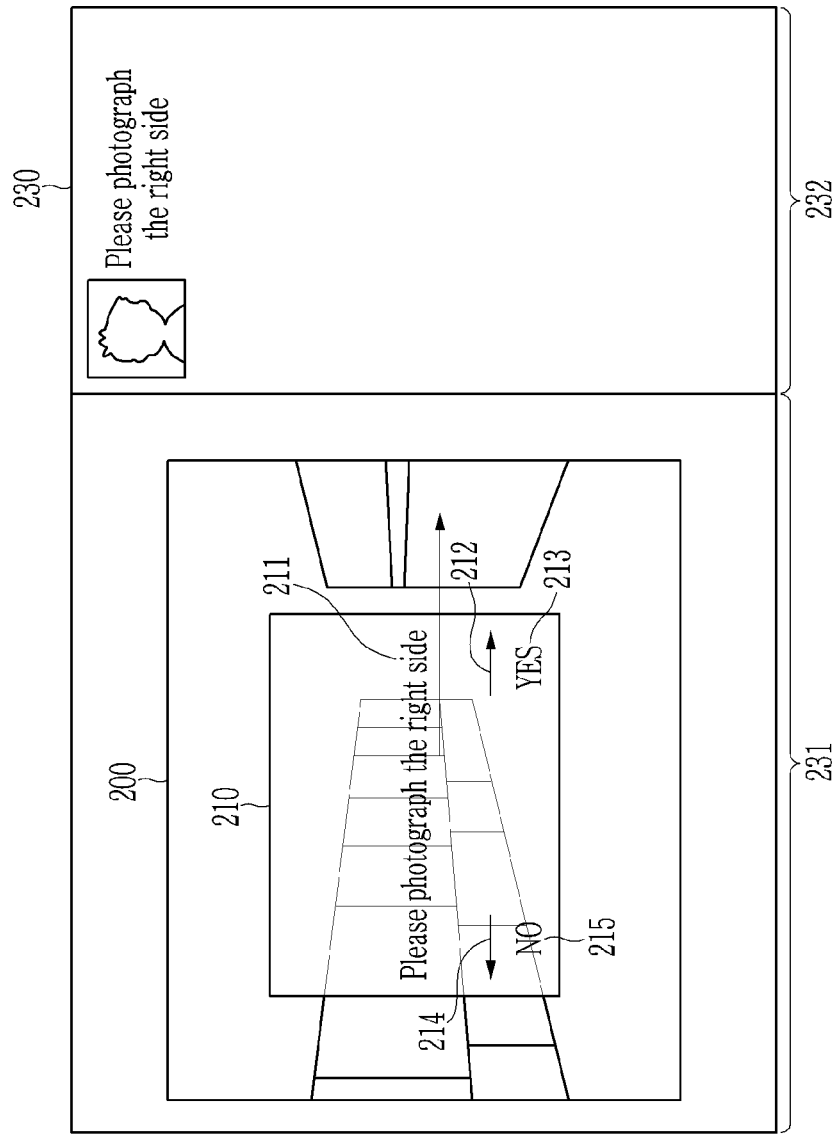
FIG. 10 is a diagram showing an example of a screen 230 displayed on a display device 26.

FIG. 10 is a diagram showing an example of a screen 230 displayed on the display device 26. The screen 230 has a display area 231 and a talk area 232. The display area 231 includes the photographed image 200 and the virtual object 210. The virtual object 210 is superimposed and displayed on the photographed image 200. Instruction information of "please photograph the right side" is displayed on the talk area 232.

The worker looks at the screen 220 shown in FIG. 9 and responds to the instruction of the instructor. In the example shown in FIG. 9, a gesture for moving the virtual object 210 with a finger in the direction of the arrow X in the figure is associated with a response "YES". Further, a gesture for moving the virtual object 210 with the finger in the direction of the arrow -X in the figure is associated with a response "NO". In other words, the response "YES" is predetermined for a moving direction in the direction of the arrow X in the figure, and the response "NO" is predetermined for a moving direction in the direction of the arrow -X in the figure.

For example, in a case of responding to the instruction of the instructor as "YES", the worker, in front of the camera 17, performs the gesture for moving the virtual object 210 with the finger in the direction of the arrow X as shown in FIG. 9. More specifically, the worker moves the finger in the direction of the arrow X in the figure from a position having a predetermined relationship with the virtual object 210. The position corresponding to the virtual object 210 is, for example, a position overlapping with the virtual object 210 in the field of view of the worker.

In step S109, an image including the finger of the worker is photographed by the camera 17. An image acquiring unit 101 acquires the image photographed by the camera 17.

In step S110, the wearable terminal 10 transmits an image data representing this image to the server device 30. The server device 30 receives the image data from the wearable terminal 10.

In step S111, an image recognizing unit 108 recognizes the gesture performed by the worker by analyzing the image data. In this example, the gesture for moving the virtual object 210 with the finger in the direction of the arrow X in the figure is recognized. More specifically, the movement of the finger moving in the direction of the arrow X in the figure from the position having the predetermined relationship with the virtual object 210 is recognized.

In steps S112 and S113, a changing unit 109 transmits, to each of the wearable terminal 10 and the remote terminal 20, control information for changing the display of the virtual object 210 by the display device 16 and the display device 26, based on a state recognized in step S111. The wearable terminal 10 and the remote terminal 20 each receive the control information from the server device 30.

In steps S114 and S115, the first display unit 106 and the second display unit 107 each changes the display of the virtual object 210 in response to the control information.

Figure 11:
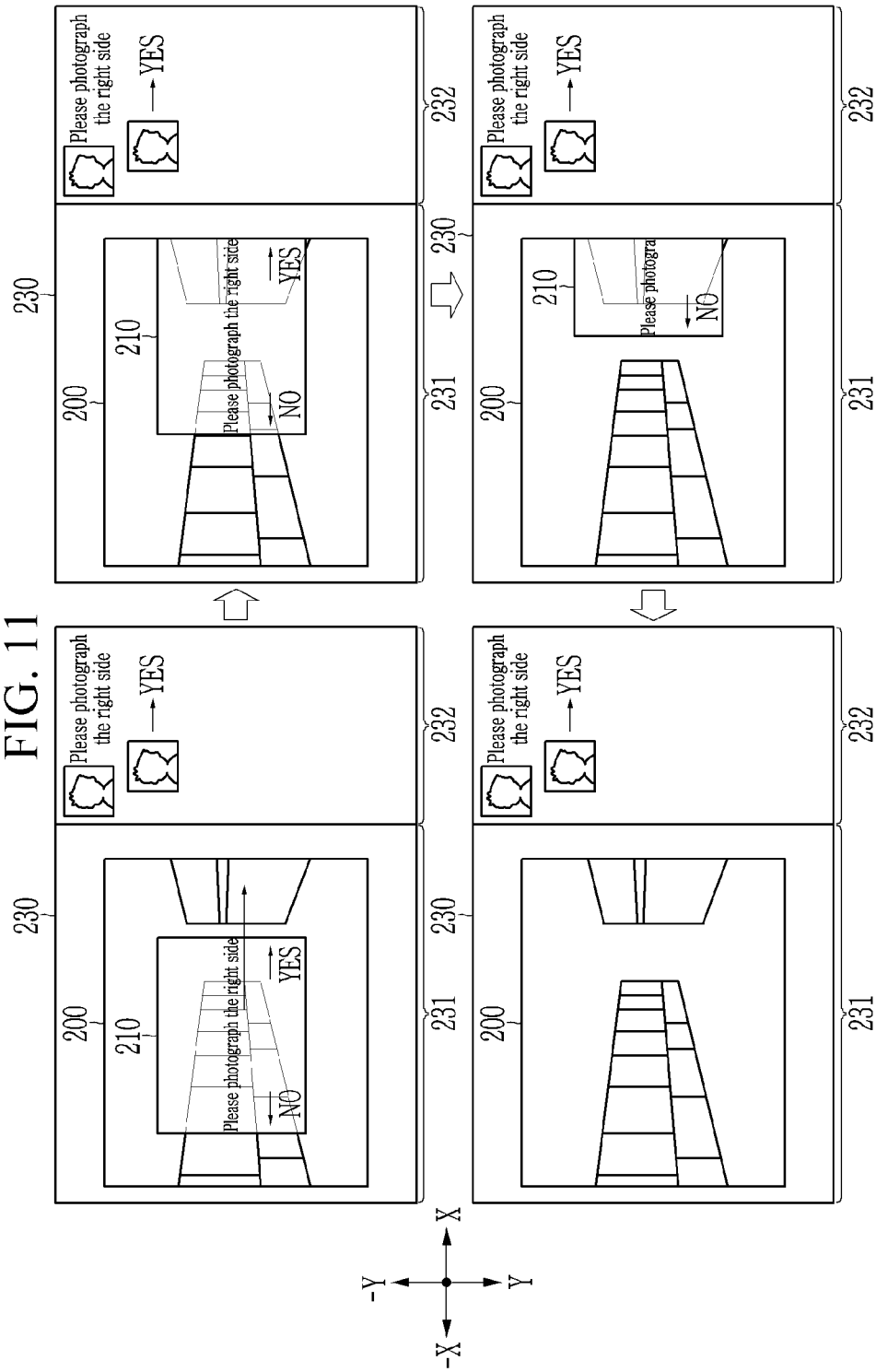
FIG. 11 is a diagram showing an example of a change in a display of a virtual object 210 in a display device 26.

FIG. 11 is a diagram showing an example of the change in the display of the virtual object 210 in the display device 26. The virtual object 210 moves in the direction of the arrow X in the figure in accordance with the movement of the worker's finger. When reaching the end of the screen 220 in the direction of the arrow X in the figure, a portion of the virtual object 210 which protrudes from the screen 220 in accordance with the movement is gradually not displayed. In this manner, the display of the virtual object 210 moves so as to go out of the screen 220 along the direction of the arrow X in the figure. The display of the virtual object 210 on the display device 16 also changes in the same way.

In step S116, a response generating unit 110 generates response information based on the state recognized in step S111. In this example, the response information of "YES" corresponding to the movement of the finger moving in the direction of the arrow X in FIG. 9 is generated.

In step S117, the server device 30 transmits the response information generated in step S116 to the remote terminal 20. The remote terminal 20 receives the response information from the server device 30.

In step S118, the second display unit 107 displays the response information on the display device 26. The response information is displayed at a position corresponding to the instruction information. In this example, the response information "YES" is displayed at the position corresponding to the instruction information "please photograph the right side" in the talk area 232, as shown in FIG. 11.

The instructor can recognize that the worker responds to the instruction of "please photograph the right side" as "YES" by viewing the change in the display of the virtual object 210 and the display of the response information.

The processing of steps S112 to S115 and the processing of steps S116 to S118 may be performed in parallel. Alternatively, the processing of steps S112 to S115 and the processing of steps S116 to S118 may be performed in reverse order, that is, the processing of steps S112 to S 115 may be performed after the processing of steps S116 to S118 is performed.

According to the above-described embodiments, the instruction of the second user using the remote terminal 20 is transmitted to the first user using the wearable terminal 10 by using the virtual object 210. The response of the first user to this instruction is transmitted to the second user by the change in the display of the virtual object 210 and the response information. As a result, even when the user using the wearable terminal 10 is in an environment where it is difficult to receive remote work support by the voice, smooth remote work support can be realized.

MODIFIED EXAMPLES

The present invention is not limited to the above-described embodiments and may be variously modified. In addition, the following modified examples may be implemented in combination with each of the above-described embodiments, or may be implemented in combination with other modified examples.

Modified Example 1

While the virtual object 210 has been exemplified in the above-described embodiments, a virtual object according to the present invention is not limited to the virtual object 210, and various modifications may be made on the content and display format thereof.

Figure 12:
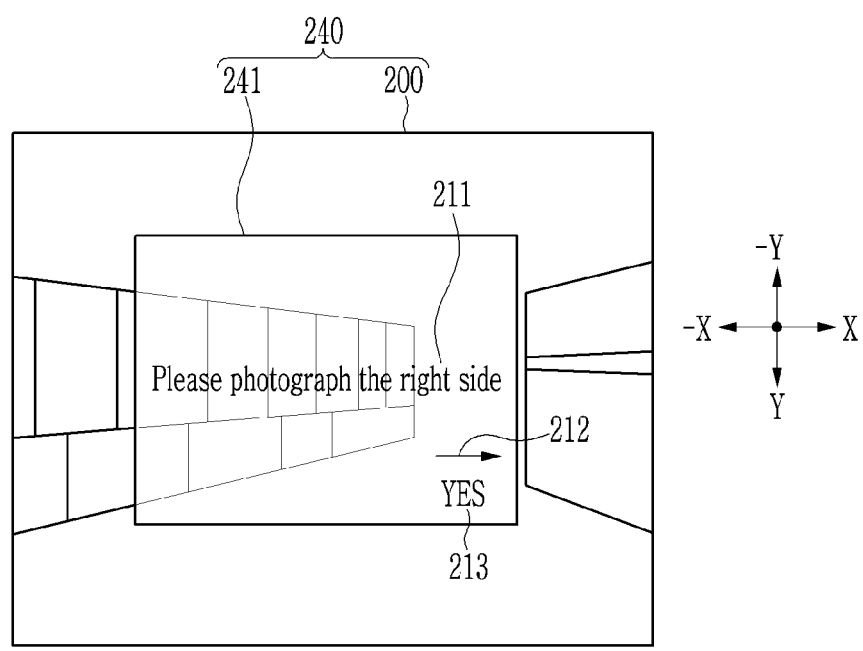
FIG. 12 is a diagram showing an example of a screen 240 displayed on a display device 16 in a modified example.

FIG. 12 is a diagram showing an example of a screen 240 displayed on a display device 16 in this modified example. The screen 240 includes a virtual object 241 in addition to the above-described photographed image 200. The virtual object 241 is superimposed and displayed on the photographed image 200. Although an arrow 212 and response information 213 are described in the virtual object 241 as in the above-described virtual object 210, the above-described arrow 214 and response information 215 are not described. In this case, if a worker performs a gesture for moving the virtual object 241 in an X direction in the figure, a response "YES" is performed in response to an instruction by the instructor like the above-described embodiments. On the other hand, when the worker does not perform this gesture and a predetermined time has elapsed, timeout occurs and a response "NO" is performed in response to the instruction by the instructor. In this case, a response generating unit 110 generates response information "NO". The photographed image 200 and the virtual object 241 are superimposed and displayed in a display area 231 of a display device 26, as in the display device 16. In addition, the response information "NO" is displayed in a talk area 232 of the display device 26.

Figure 13:
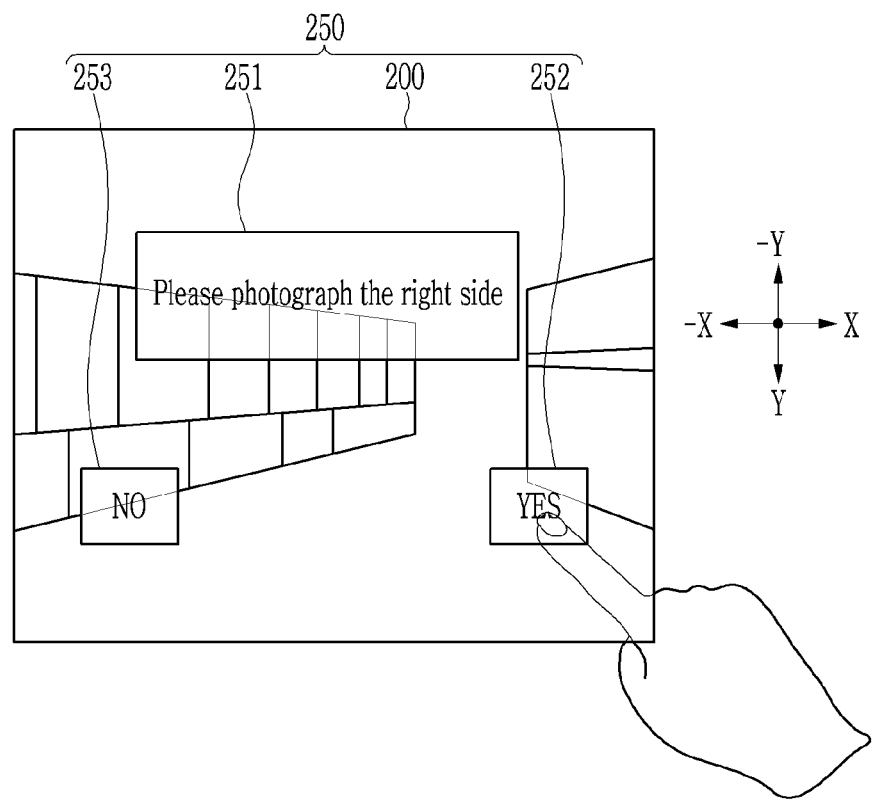
FIG. 13 is a diagram showing another example of a screen 250 displayed on a display device 16 in a modified example.

FIG. 13 is a diagram showing another example of a screen 250 displayed on a display device 16 in this modified example. The screen 250 includes virtual objects 251, 252, and 253 in addition to the above-described photographed image 200. The objects 251, 252, and 253 are superimposed and displayed on the photographed image 200. Instruction information "please photograph the right side" is described in the virtual object 251, as in the above-described virtual object 210. Response information "YES" is described in the virtual object 252. Response information "NO" is described in the virtual object 253. The virtual objects 252 and 253 function as software keys. In this example, a gesture for touching the virtual object 252 and a response "YES" are associated with each other. Further, a gesture for touching the virtual object 253 and a response "NO" are associated with each other. In other words, the response "YES" is predetermined for the virtual object 252 and the response "NO" is predetermined for the virtual object 253.

For example, when responding to the instruction of the worker as "YES", the worker performs the gesture for touching the virtual object 252. In this case, an image recognizing unit 108 recognizes this gesture. More specifically, the image recognizing unit 108 recognizes a position of a finger having a predetermined relationship with the virtual object 252. This predetermined relationship may be, for example, a position overlapping with the virtual object 252 in a field of view of the worker. A response generating unit 110 generates response information "YES" corresponding to the virtual object 252. The photographed image 200 and the virtual objects 251, 252, and 253 are superimposed and displayed in a display area 231 of a display device 26, as in the display device 16. Further, response information "YES" is displayed in a talk area 232 of the display device 26. In this case, a changing unit 109 may change the display of the virtual object 252 displayed on the display device 16 and the display device 26. For example, the changing unit 109 may change the color, shape, or size of the virtual object 252.

Modified Example 2

While a response "YES" or "NO" has been exemplified in the above-described embodiments, the response according to the present invention is not limited to "YES" or "NO". For example, the response may be a numerical value or a character. In this case, a virtual object for inputting the numerical value or the character is used. This virtual object may be generated and stored in a storage device 34 in advance.

Figure 14:
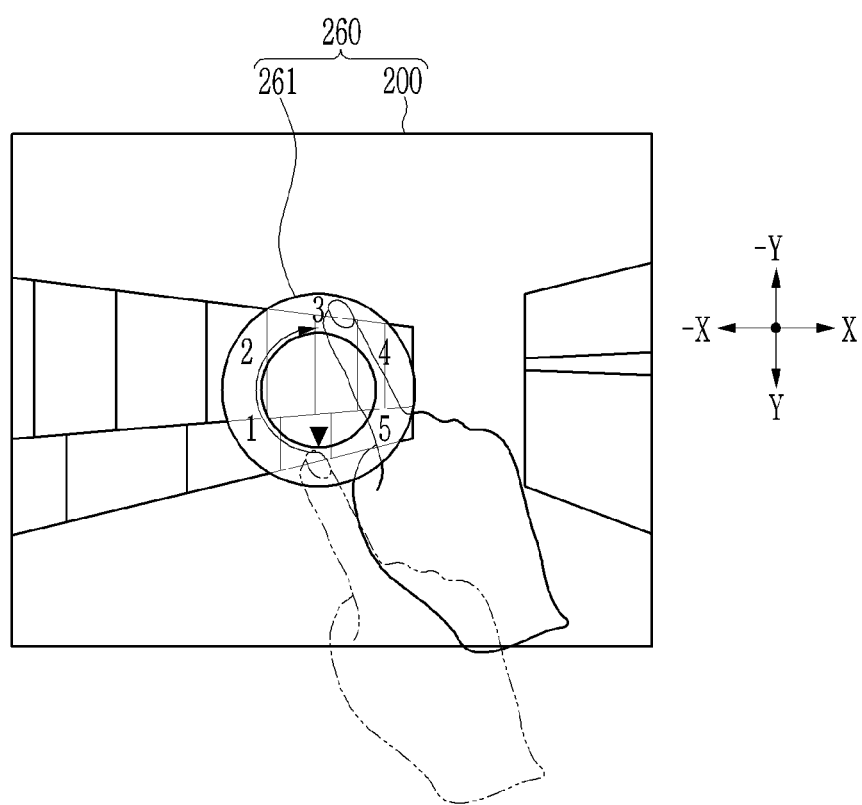
FIG. 14 is a diagram showing an example of a screen 260 displayed on a display device 16 in a modified example.

FIG. 14 is a diagram showing an example of a screen 260 displayed on a display device 16 in this modified example. The screen 260 includes a virtual object 261 in addition to the above-described photographed image 200. The virtual object 261 is superimposed and displayed on the photographed image 200. The virtual object 261 functions as a software dial. The virtual object 261 is provided with scales of "1" to "5". In this example, rotation amounts corresponding to these scales are associated with responses including the numerical value of "1" to "5", respectively. In other words, the responses including numerical values of "1" to "5" are predetermined for the rotation amounts corresponding to the scales of "1" to "5".

For example, it is assumed that instruction information indicates an instruction "please tell me the thickness of an object". Since it is necessary to input a numerical value in order to respond to this instruction, the virtual object 261 used for inputting the numerical value is displayed on the display devices 16 and 26. That is, the virtual object 261 is responsive to the instruction information. In this case, the worker measures the thickness of the object using, for example, a caliper. For example, when the thickness of the object is "3", the worker performs a gesture for rotating the virtual object 261 to the scale "3". More specifically, the worker rotates and moves a finger clockwise from a position corresponding to an initial position to a position corresponding to the scale "3" in an area having a predetermined relationship with the virtual object 261. The area having the predetermined relationship may be, for example, an area along a circumference of the virtual object 261.

In this case, an image recognizing unit 108 recognizes this gesture. More specifically, the image recognizing unit 108 recognizes a movement of the finger that rotates the finger clockwise in the area having the predetermined relationship with the virtual object 261. In accordance with the movement of the finger, a changing unit 109 rotates the virtual object 261 displayed on the display devices 16 and 26 to the scale "3". The response generating unit 110 generates response information "3" corresponding to the rotation amount of the virtual object 261. The photographed image 200 and the virtual object 261 are superimposed and displayed in a display area 231 of the display device 26, as in the display device 16. Further, the response information "3" is displayed in a talk area 232 of the display device 26.

In another example, a virtual object may function as a software keyboard. In this case, the virtual object has a plurality of key areas that correspond to a plurality of characters, respectively. A worker performs a gesture for touching a key area corresponding to a desired character. In this case, an image recognizing unit 108 recognizes a position of a finger having a predetermined relationship with this key area. The position having the predetermined relationship may be, for example, a position overlapping with the key area in a field of view of the worker. A response generating unit 110 generates response information including the character corresponding to this key area.

Modified Example 3

In the above-described embodiments, various responses may be performed by using gestures. The response may include a request or a question to an instructor. In this case, a virtual object may include a list of gestures.

Figure 15:
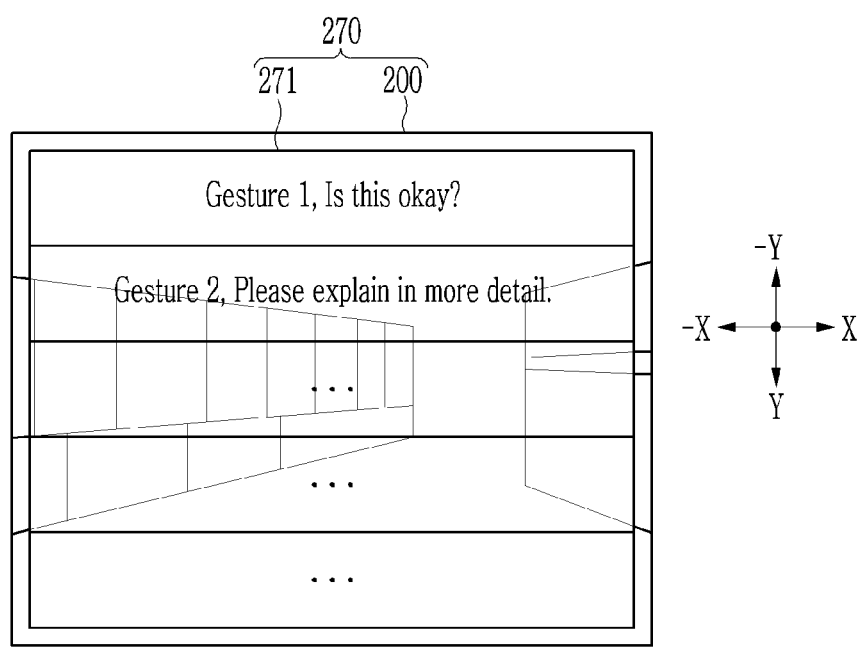
FIG. 15 is a diagram showing an example of a screen 270 displayed on a display device 16 in a modified example.

FIG. 15 is a diagram showing an example of a screen 270 displayed on a display device 16 in this modified example. The screen 270 includes a virtual object 271 in addition to the above-described photographed image 200. The virtual object 271 is superimposed and displayed on the photographed image 200. A list of gestures is described in the virtual object 271. For example, the list of gestures may include a plurality of pieces of gesture information corresponding to a plurality of response candidates for an instruction by an instructor. In other words, the virtual object 271 is responsive to the instruction information. Each piece of gesture information includes information for representing a gesture with a character or an image and response information corresponding to the gesture. A worker selects a gesture corresponding to desired response information from among a plurality of gestures indicated by the list of gestures and performs the selected gesture. In this case, a response generating unit 110 generates response information corresponding to this gesture. The photographed image 200 and the virtual object 271 are superimposed and displayed in a display area 231 of the display device 26, as in the display device 16. Further, the response information generated by the response generating unit 110 is displayed in a talk area 232 of the display device 26.

Modified Example 4

In the above-described embodiments, a three-dimensional virtual object may be provided from a remote terminal 20 to a wearable terminal 10. Here, it is assumed that a three-dimensional drawing of a certain building is provided from an instructor to a worker. In this case, the remote terminal 20 transmits a drawing data representing this three-dimensional drawing to the wearable terminal 10 directly or via a server device 30. In this case, the drawing data may be used as instruction information. Upon receiving this drawing data, the wearable terminal 10 displays the three-dimensional drawing corresponding to the received drawing data on a display device 16 as a virtual object 281.

Figure 16:
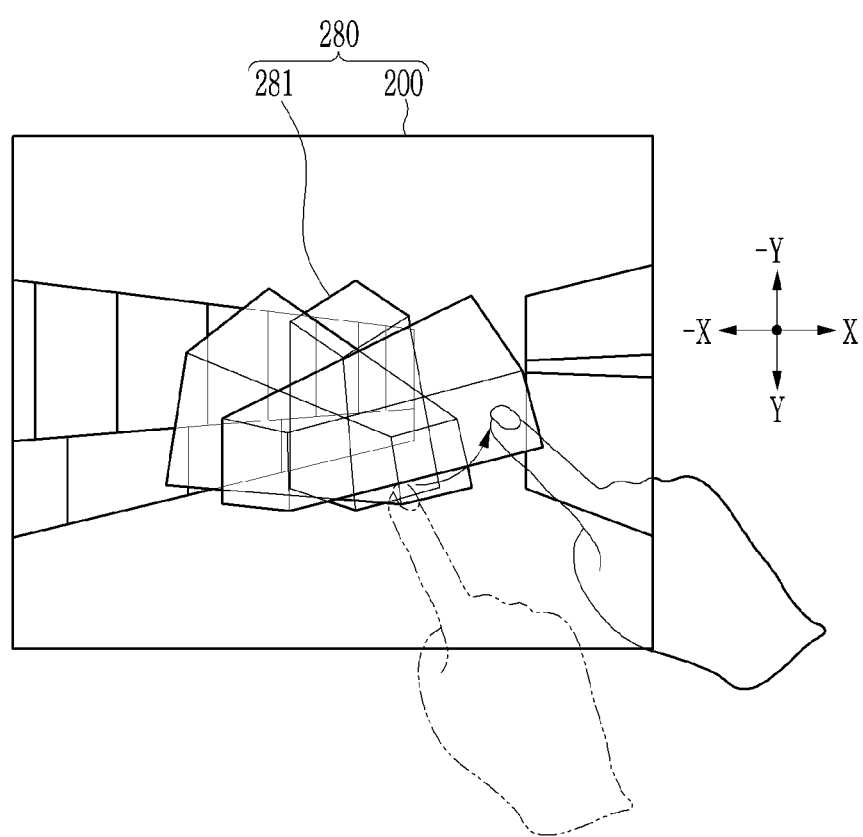
FIG. 16 is a diagram showing an example of a screen 280 displayed on a display device 16 in a modified example.

FIG. 16 is a diagram showing an example of a screen 280 displayed on the display device 16 in this modified example. The screen 280 includes the virtual object 281 in addition to the above-described photographed image 200. The virtual object 281 is superimposed and displayed on the photographed image 200. The virtual object 281 is responsive to instruction information. The photographed image 200 and the virtual object 281 are overlapped and displayed in a display area 231 of the display device 26, as in the display device 16. For example, it is assumed that the instruction information indicates an instruction "please tell me where a machine room is." In this case, the worker performs a gesture for operating the virtual object 281 with a finger to display a location of the machine room, and then performs a gesture for pointing to the location of the machine room. The gesture to be operated may be, for example, a gesture that moves or rotates the virtual object 281. In this case, a changing unit 109 moves the virtual object 281 in accordance with the movement of the finger. For example, in a case of the gesture for moving or rotating the virtual object 281, the virtual object 281 is moved or rotated. Further, an image recognizing unit 108 recognizes a position of the finger corresponding to the location of the machine room on the virtual object 281. A response generating unit 110 generates response information indicating the position of the machine room on the virtual object 281. In this case, in the virtual object 281 displayed in the display area 231 of the display device 26, a predetermined mark may be added to the position indicated by the response information.

Modified Example 5

While an example in which instruction information is generated based on a voice of an instructor has been described in the above-described embodiments, the instruction information may be generated in advance. For example, the instruction information may be a questionnaire to be used for checking work processes. The questionnaire includes a plurality of items that correspond to a plurality of work processes, respectively. In each item, facts to be checked in the work process are described in question form. In this case, a remote terminal 20 sequentially transmits a plurality of item data indicating a plurality of items included in the questionnaire to a wearable terminal 10 directly or via a server device 30. The transmission of the first item data may be performed according to an operation of a worker or may be performed when a predetermined condition is satisfied. The predetermined condition may be, for example, a condition that a predetermined time has come. The transmission of the second and subsequent item data may be performed when a response to the immediately preceding item is performed. The wearable terminal 10 receives the item data. In this case, the items included in the questionnaire and the above-described virtual object 261 are displayed on a display device 16 and a display device 26.

Figure 17:
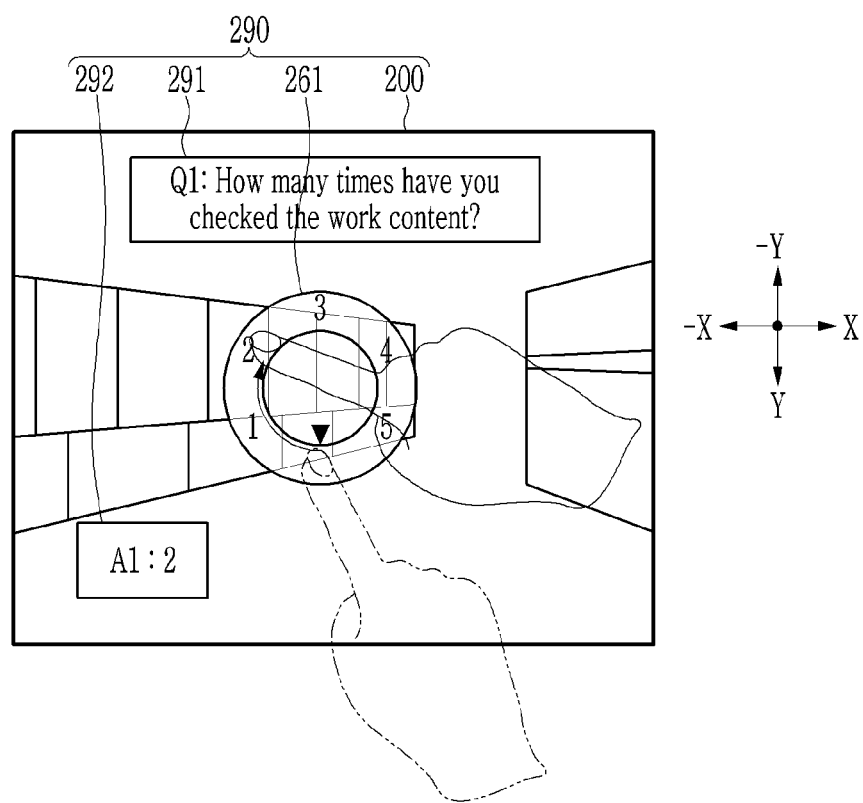
FIG. 17 is a diagram showing an example of a screen 290 displayed on a display device 16 in a modified example.

FIG. 17 is a diagram showing an example of a screen 290 displayed on the display device 16 in this modified example. The screen 290 includes virtual objects 291 and 292 in addition to the photographed image 200 and the virtual object 261 described above. The virtual objects 261, 291, and 292 are superimposed and displayed on the photographed image 200. The virtual object 291 includes the first item included in the questionnaire. Here, it is assumed that the first item is a question "how many times have you checked the work content?" For example, when checking the work content twice, a worker performs a gesture for rotating the virtual object 261 to a scale "2". In this case, an image recognizing unit 108 recognizes this gesture as in the above-described modified example 2. A changing unit 109 rotates the virtual object 261 to the scale "2" in accordance with the movement of the finger. A response generating unit 110 generates response information "2" corresponding to the rotation amount of the virtual object 261. In this case, the response information "2" is described in the virtual object 292. The photographed image 200, the virtual object 261, and the virtual objects 291 and 292 are superimposed and displayed in a display area 231 of the display device 26, as in the display device 16. Further, the response information "2" is displayed in a talk area 232 of the display device 26. In this manner, when the response to the first item is returned, the second item is described in the virtual object 291. This process is repeated, for example, until responses to all the items included in the questionnaire are returned.

Modified Example 6

In the above-described embodiments, one instructor may instruct work to a plurality of workers. In this case, a plurality of wearable terminals 10 are provided. The wearable terminals 10 are worn by the plurality of workers, respectively.

FIG. 18 is a diagram showing an example of a screen 300 displayed on a display device 26 in this modified example. The screen 300 has a display area 301 similar to the above-described display area 231 and a talk area 302 similar to the above-described talk area 232. The display area 301 includes a plurality of photographed images 200, 201, and 202 photographed by the plurality of wearable terminals 10. In this case, a response generating unit 110 generates a plurality of pieces of response information for the plurality of workers. These pieces of response information are displayed in the talk area 232 of the display device 26. These pieces of response information are displayed in different display formats. For example, these pieces of response information may have different colors, shapes, or sizes. In addition, worker information on a corresponding worker may be added to each piece of response information. The worker information may be, for example, a face image of the worker.

Modified Example 7

In the above-described embodiments, a composite image of a photographed image 200 and a virtual object 210 may be generated in a wearable terminal 10, a remote terminal 20, or a server device 30. In this case, the photographed image 200 and the virtual object 210 may be combined at a position and a size for reproducing a field of view of a worker. Further, a size, a position, or an angle of the virtual object 210 may be changed by an operation of the worker.

Modified Example 8

In the above-described embodiments, an instruction of an instructor may be inputted by means other than a voice. In this case, a voice recognizing unit 103 may not be provided. For example, a worker may input a character data indicating an instruction using an input device 25. In this case, an accepting unit 102 accepts an input of the character data. An object generating unit 104 generates a virtual object based on the character data. As another example, when stamp images indicating a plurality of instructions are prepared, the worker selects a stamp image indicating a desired instruction from among the stamp images using the input device 25. In this case, the accepting unit 102 accepts an input of an image data indicating the selected stamp image. The object generating unit 104 generates the virtual object based on the image data. In other words, instruction information for the photographed image 200 may be a voice data indicating a voice of a second user, or may be a text data or an image data inputted by the operation of the second user.

Modified Example 9

In the above-described embodiments, a target photographed by a camera 17 is not limited to a space in front of a first user. The target photographed by the camera 17 may be around the first user. Further, a virtual object 210 may be generated and stored in at least one of a storage device 14, a storage device 24, and a storage device 34 in advance. In this case, an object generating unit 104 may not be provided. Furthermore, a worker may perform a gesture using a body part, such as a head or a foot, other than a finger.

Modified Example 10

While an example in which a wearable terminal according to the present invention is a binocular glasses-type wearable terminal 10 of has been described in the above-described embodiments, the wearable terminal is not limited to this example. For example, the wearable terminal may be a monocular glass-type wearable terminal or a head mount-type wearable terminal.

Modified Example 11

In the above-described embodiments, programs for realizing functions of a wearable terminal 10 may be executed by a single processor 11, or may be simultaneously or sequentially executed by two or more processors 11. The same applies to a remote terminal 20 and a server device 30.

Modified Example 12

A subject for implementing functions of a remote work supporting system 1 described in the above-described embodiments is merely an example and is not limited thereto. For example, a wearable terminal 10, a remote terminal 20, or both may have at least part of functions of the server device 30. For example, the remote terminal 20 may function as the voice recognizing unit 103, the object generating unit 104, and the screen sharing unit 105 described above, and the wearable terminal 10 may function as the screen sharing unit 105, the image recognizing unit 108, the changing unit 109, and the response generating unit 110 described above. In this case, the server device 30 may have only a function of relaying data between the wearable terminal 10 and the remote terminal 20. Alternatively, the server device 30 may not be provided.

Modified Example 13

Steps of processing performed in a remote work supporting system 1 are not limited to an example described in the above-described embodiments. The steps of processing may be interchanged unless there is a contradiction. Further, the present invention may be provided as a remote work supporting method including the steps of processing performed in the remote work supporting system 1.

Modified Example 14

The present invention may be provided as programs to be executed in a wearable terminal 10, a remote terminal 20, or a server device 30. The programs may be downloaded via a network such as the Internet or the like. Further, the programs may be provided in a state where they are recorded on a computer-readable recording medium such as a magnetic recording medium (a magnetic tape, a magnetic disk, etc.), an optical recording medium (optical disk, etc.), a magneto-optical recording medium, a semiconductor memory, or the like.

Modified Example 15

In the above-described embodiments, a virtual object 210 and a photographed image 200 may be combined in a wearable terminal 10 or a remote terminal 20. If the combining is performed in the wearable terminal 10, instruction information is inputted from the remote terminal 20 to the wearable terminal 10. The wearable terminal 10 generates a composite image into which the virtual object and the photographed image 200 are combined according to the instruction information, and displays the composite image on the display device 16. On the other hand, if the combining is performed in the remote terminal 20, the remote terminal 20 generates the composite image into the virtual object 210 and the photographed image 200 are combined according to instruction information inputted by a second user, and transmits a composite image data representing the composite image to the wearable terminal 10. The wearable terminal 10 displays the composite image corresponding to the composite image data received from the remote terminal 20 on a display device 16. Comparing a case in which the combining is performed in the wearable terminal 10 and a case in which the combining is performed in the remote terminal 20, a data transfer speed increases in the former case since the transmission of the composite image data does not occur.

What is claimed is:

1. A remote work supporting system for sharing an image photographed by a wearable terminal between the wearable terminal and a remote terminal in order to support remote work, comprising:
   an image acquiring unit that acquires an image photographed by the wearable terminal;
   a screen sharing unit that screen-shares the image between the wearable terminal and the remote terminal;
   an accepting unit that accepts an input of instruction information for the image from the remote terminal;
   a first display unit that superimposes and displays the image and a virtual object corresponding to the instruction information on the wearable terminal;
   a second display unit that superimposes and displays the image and the virtual object on the remote terminal;
   an image recognizing unit that analyzes the image to recognize a state of a finger;
   a changing unit that when a movement of the finger moving from a position having a predetermined relationship with the virtual object is recognized by the image recognizing unit, changes a display of the virtual object by the first display unit and the second display unit to move the virtual object in accordance with the recognized movement; and
   a response generating unit that generates response information that is predetermined for a moving direction of the virtual object,
   wherein the second display unit further displays the response information generated by the response generating unit.

2. The remote work supporting system according to claim 1, wherein the instruction information is a voice data indicating a voice of a user of the remote terminal,
   wherein the remote work supporting system further comprises a voice recognizing unit that recognizes a content of the voice by analyzing the voice data, and
   wherein the virtual object is generated in accordance with the content of the recognized voice.

3. The remote work supporting system according to claim 1,
   wherein each of the first display unit and the second display unit displays a plurality of virtual objects corresponding to the instruction information, and
   wherein when a position of the finger having a predetermined relationship with any one of the plurality of virtual objects is recognized by the image recognizing unit, the response generation unit generates the response information that is predetermined for the object.

4. The remote work supporting system according to claim 1,
   wherein when a movement of the finger rotating and moving in an area having a predetermined relationship with the virtual object is recognized by the image recognizing unit, the changing unit rotates the virtual object in accordance with the recognized movement, and
   wherein the response generating unit generates the response information that is predetermined for a rotation amount of the virtual object.

5. The remote work supporting system according to claim 1, wherein the body part is a finger,
   wherein the virtual object indicates a list of a plurality of states of the finger, and
   wherein when any one of the plurality of states is recognized by the image recognizing unit, the response generating unit generates the response information that is predetermined for the recognized state.

6. The remote work supporting system according to claim 1, wherein a plurality of users use a plurality of wearable terminals, respectively,
   wherein the first display unit is provided for each of the plurality of wearable terminals,
   wherein the response generating unit generates a plurality of pieces of response information for the plurality of users respectively, and
   wherein the second display unit displays the plurality of pieces of response information in different display formats.

7. The remote work supporting system according to claim 1, wherein the virtual object is a three-dimensional virtual object,
   and
   wherein when a movement of the finger operating the virtual object is recognized by the image recognizing unit, the changing unit changes the virtual object in accordance with the recognized movement.

8. The remote work supporting system according to claim 1, wherein the wearable terminal is worn on a head of a user,
   wherein the first display unit displays the image and the virtual object on a display panel having light transparency provided within a field of view of the user, and
   wherein the user performs an operation on the virtual object using the finger seen through the display panel.

9. A remote work supporting method for screen-sharing an image photographed by a wearable terminal between the wearable terminal and a remote terminal in order to support remote work, comprising:
   an image acquiring step of acquiring an image photographed by the wearable terminal;
   a screen sharing step of screen-sharing the image between the wearable terminal and the remote terminal;
   an accepting step of accepting an input of instruction information for the image from the remote terminal;
   a first display step of superimposing and displaying the image and a virtual object corresponding to the instruction information on the wearable terminal;
   a second display step of superimposing and displaying the image and the virtual object on the remote terminal,
   an image recognizing step of analyzing the image to recognize a state of a finger;

a changing step of, when a movement of the finger moving from a position having a predetermined relationship with the virtual object is recognized, changing a display of the virtual object by the first display step and the second display step to move the virtual object in accordance with the recognized movement;

a response generating step of generating response information that is predetermined for a moving direction of the virtual object, and a third display step of displaying the generated response information on the remote terminal.

10. A program for screen-sharing an image photographed by a wearable terminal between the wearable terminal and a remote terminal in order to support remote work, the program causing a computer to execute:

an image acquiring step of acquiring an image photographed by the wearable terminal;

a screen sharing step of screen-sharing the image between the wearable terminal and the remote terminal;

an accepting step of accepting an input of instruction information for the image from the remote terminal;

a first display step of superimposing and displaying the image and a virtual object corresponding to the instruction information on the wearable terminal;

a second display step of superimposing and displaying the image and the virtual object on the remote terminal, an image recognizing step of analyzing the image to recognize a state of a finger;

a changing step of, when a movement of the finger moving from a position having a predetermined relationship with the virtual object is recognized, changing a display of the virtual object by the first display step and the second display step to move the virtual object in accordance with the recognized movement;

a response generating step of generating response information that is predetermined for a moving direction of the virtual object, and a third display step of displaying the generated response information on the remote terminal.

11. A remote work supporting system for sharing images photographed by a plurality of wearable terminals being respectively used by a plurality of users between each of the wearable terminals and a remote terminal in order to support remote work, comprising:

an image acquiring unit that acquires an image photographed by each of the wearable terminals;

a screen sharing unit that screen-shares the image between each of the wearable terminals and the remote terminal;

an accepting unit that accepts an input of instruction information for the image from the remote terminal;

a first display unit that is provided for each of the wearable terminals, and superimposes and displays the image and a virtual object corresponding to the instruction information on each of the wearable terminals;

a second display unit that superimposes and displays the image and the virtual object on the remote terminal;

an image recognizing unit that analyzes the image to recognize a state of a body part;

a changing unit that changes a display of the virtual object by the first display unit and the second display unit based on the recognized state; and a response generating unit that generates a plurality of pieces of response information for the plurality of users respectively, based on the state recognized by the image recognizing unit and the display of the virtual object, wherein the second display unit displays the plurality of pieces of response information in different display formats.

12. A remote work supporting method for sharing images photographed by a plurality of wearable terminals being respectively used by a plurality of users between each of the wearable terminals and a remote terminal in order to support remote work, comprising:

an image acquiring step of acquiring an image photographed by each of the wearable terminals;

a screen sharing step of screen-sharing the image between each of the wearable terminals and the remote terminal;

an accepting step of accepting an input of instruction information for the image from the remote terminal;

a first display step of superimposing and displaying the image and a virtual object corresponding to the instruction information on each of the wearable terminals;

a second display step of superimposing and displaying the image and the virtual object on the remote terminal;

an image recognizing step of analyzing the image to recognize a state of a body part;

a changing step of changing a display of the virtual object by the first display step and the second display step based on the recognized state;

a response generating step of generating a plurality of pieces of response information for the plurality of users respectively, based on the recognized state and the display of the virtual object; and a third display step of displaying on the remoter terminal the plurality of pieces of response information in different display formats.

13. A program for sharing images photographed by a plurality of wearable terminals being respectively used by a plurality of users between each of the wearable terminals and a remote terminal in order to support remote work, the program causing a computer to execute:

an image acquiring step of acquiring an image photographed by each of the wearable terminals;

a screen sharing step of screen-sharing the image between each of the wearable terminals and the remote terminal;

an accepting step of accepting an input of instruction information for the image from the remote terminal;

a first display step of superimposing and displaying the image and a virtual object corresponding to the instruction information on each of the wearable terminals;

a second display step of superimposing and displaying the image and the virtual object on the remote terminal;

an image recognizing step of analyzing the image to recognize a state of a body part;

a changing step of changing a display of the virtual object by the first display step and the second display step based on the recognized state;

a response generating step of generating a plurality of pieces of response information for the plurality of users respectively, based on the recognized state and the display of the virtual object; and a third display step of displaying on the remoter terminal the plurality of pieces of response information in different display formats.

* * * * *